(12) United States Patent
Larzul (10) Patent No.: US 9,959,375 B2
(45) Date of Patent: May 1, 2018

(54) EFFICIENT EMULATION AND LOGIC ANALYSIS

(71) Applicant: Synopsys, Inc., Mountain View, CA (US)

(72) Inventor: Ludovic Marc Larzul, Folsom, CA (US)

(73) Assignee: Synopsys, Inc., Mountain View, CA (US)

( * ) Notice: Subject to any disclaimer, the term of this patent is extended or adjusted under 35 U.S.C. 154(b) by 775 days.

(21) Appl. No.: 14/507,696

(22) Filed: Oct. 6, 2014

(65) Prior Publication Data

US 2016/0098505 A1    Apr. 7, 2016

(51) Int. Cl.
*G06F 17/50* (2006.01)

(52) U.S. Cl.
CPC ...... *G06F 17/5027* (2013.01); *G06F 17/5036* (2013.01); *G06F 2217/78* (2013.01)

(58) Field of Classification Search
CPC ............. G06F 17/5027; G06F 17/5036; G06F 2217/78
See application file for complete search history.

(56) References Cited

U.S. PATENT DOCUMENTS

| 7,386,828 | B1* | 6/2008 | Safarpour | ........... | G06F 17/5027 716/105 |
| 2004/0254906 | A1* | 12/2004 | Shei | .................... | G06F 17/5027 703/23 |
| 2005/0267730 | A1* | 12/2005 | Kfir | ..................... | G06F 17/5027 703/26 |
| 2013/0227509 | A1* | 8/2013 | Chang | ................. | G06F 17/5027 716/111 |

* cited by examiner

*Primary Examiner* — Brian W Wathen
*Assistant Examiner* — Carina Yun
(74) *Attorney, Agent, or Firm* — Fenwick & West LLP (57) ABSTRACT

An emulation environment includes a host system and an emulator. The host system configures the emulator to load a design under test (DUT) and the emulator emulates the DUT. The emulator includes one or more design field-programmable gate arrays (FPGAs) that emulate the DUT. In addition, the emulator includes at least one system FPGA with a logic analyzer and multiple virtual FPGA. The virtual FPGAs emulate sections of the DUT. By the virtual FPGAs emulating sections of the DUT, the logic analyzer is able to obtain for performing logic analysis certain signals from the virtual FPGAs, rather than from the design FPGAs.

20 Claims, 7 Drawing Sheets

EFFICIENT EMULATION AND LOGIC ANALYSIS

BACKGROUND

1. Field of Art

The disclosure generally relates to the emulation of circuits, and more specifically to performing logic analysis of an emulated circuit.

2. Description of the Related Art

Emulators have been developed to assist circuit designers in designing and debugging highly complex integrated circuits. An emulator includes multiple reconfigurable components, such as field programmable gate arrays (FPGAs) that together can imitate the operations of a design under test (DUT). By using an emulator to imitate the operations of a DUT, designers can verify that a DUT complies with various design requirements prior to a fabrication.

One aspect of emulation includes performing logic analysis of a DUT. In one approach, performing logic analysis involves emulating a DUT and analyzing signals from the emulated DUT with a logic analyzer to verify, for example, timing relationships and digital logic operations of the DUT. In advanced processes (e.g., 22 nm and below), a DUT may include billons of logic circuits and signals. Emulating such a complex DUT involves transferring a large amount of data between the logic analyzer and multiple FPGAs. Therefore, conventional logic analysis in an emulation environment is inefficient in terms of hardware and communication resources.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. It should be recognized from the following description that alternative embodiments of the structures and methods illustrated herein may be employed without departing from the principles described herein.

The figures uses like reference numerals to identify like elements. A letter after a reference numeral, such as "230A," indicates that the text refers specifically to the element having that particular reference numeral. A reference numeral in the text without a following letter, such as "230," refers to any or all of the elements in the figures bearing that reference numeral.

Configuration Overview

A disclosed emulation environment performs bandwidth efficient analysis of a digital system. One embodiment of the emulation environment includes a host system and an emulator. The host system configures the emulator to load a design under test (DUT) and the emulator emulates the DUT accordingly. In one aspect, the emulator includes one or more design field-programmable gate arrays (FPGAs) that emulate the DUT. In addition, the emulator includes at least one system FPGA with a logic analyzer and multiple virtual FPGAs. The virtual FPGAs emulate sections of the DUT. By emulating sections of the DUT with the virtual FPGAs, the logic analyzer is able to obtain, for performing logic analysis, certain signals from the virtual FPGAs, rather than from the design FPGAs. As a result, fewer signals are traced by the design FPGAs and fewer signals are exchanged between the design FPGAs and the system FPGA, thereby achieving a savings in communication bandwidth.

Example Emulation Environment

Figure 1:
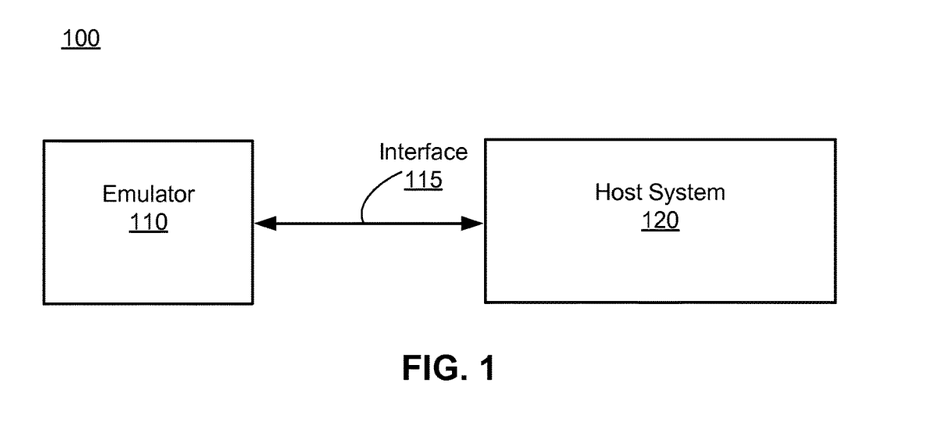
FIG. 1 is a block diagram of an emulation environment, according to one embodiment.

FIG. 1 is a block diagram illustrating an emulation environment 100, according to one embodiment. The emulation environment 100 includes an emulator 110 and a host system 120. The emulator 110 and the host system 120 communicate through an interface 115.

The interface 115 is a communication medium that allows communication between the host system 120 and the emulator 110. In one embodiment, the interface 115 is a cable with electrical connections. For example, the interface 115 may be an RS232, USB, LAN, optical, or a custom built cable. In other embodiment, the interface 115 is a wireless communication medium or a network. For another example, the interface 115 may be a wireless communication medium employing a Bluetooth® or IEEE 802.11 protocol.

The host system 120 configures the emulator 110 for emulating a design under test (DUT). The host system 120 communicates with the emulator 110 during emulation of a DUT. A DUT is one or more circuit designs that are to be emulated by the emulator 110. The host system 120 may be a single computer or a collection of multiple computers. In the embodiment where the host system 120 is comprised of multiple computers, the functions described herein as being performed by the host system 120 may be distributed among the multiple computers.

The host system 120 receives from a user a description of a DUT to be implemented on the emulator 110. In one embodiment, the description of the DUT is in a type of hardware description language (HDL), such as register transfer language (RTL). The host system 120 creates a gate level netlist based on the HDL description of the DUT. The host system 120 uses the netlist to partition the DUT into multiple partitions. The host system 120 maps (i.e., assigns) each partition to one or more design field-programmable gate arrays (FPGAs) included in the emulator 110. Together the design FPGAs will emulate the DUT. Further, the host system 120 identifies sections of the DUT that will also be emulated by virtual FPGAs within a system FPGA of the emulator 110 that includes a logic analyzer. Each identified section is mapped to a virtual FPGA. As described in more detail below with reference to the emulator 110, by mapping sections of the DUT to virtual FPGAs included in the system FPGA, the system FPGA's logic analyzer is able to obtain certain signals of the DUT directly from virtual FPGAs instead of from the design FPGAs during emulation of the DUT. This helps limit the amount of signals traced by the design FPGAs and the amount of signals exchanged between the design FPGAs and the system FPGAs. Furthermore, the amount of logic for multiplexing signals to trace and transmit to the system FPGA is reduced.

Binary files are created by the host system 120 which include information to configure the design FPGAs and the virtual FPGAs based on the DUT and the mappings. A binary file may include, for example, a design description of one or more partitions or sections (e.g., gate level or HDL description), mapping information (e.g., mappings of partitions and sections to FPGAs), connection information (e.g., connections between components of the DUT and/or connections between FPGAs) and design constraints for the DUT.

Further, the host system 120 receives from a user one or more state machines that are to be used by a logic analyzer of the emulator 110 during emulation of the DUT. A state machine includes a set of logic events and/or states to be applied to the DUT during emulation. Based on the received state machines, the host system 120 identifies signals of the DUT to trace for performing logic analysis of the DUT. The host system 120 determines which of the identified signals can be obtained from sections mapped to virtual FPGAs and identifies which of the virtual FPGAs need to be run to obtain those signals.

Through interface 115, the host system 120 transmits to the emulator 110 created binary files to configure the design FPGAs to emulate the DUT and to configure the identified virtual FPGAs. During and/or after the emulator 110 emulates the DUT, the host system 120 receives emulation results from the emulator 110. Emulation results are information generated by the emulator 110 based on the emulation of the DUT. The emulation results may include logic analysis results provided by the logic analyzer, such as information describing timing relationships or the states of signals of the DUT traced during the emulation.

The host system 120 may convert the emulation results into another representation for display to a user. For example, the emulation results may be converted to indicate failure of logic operations or timing mismatches. Based on the emulation results, a user may modify the DUT and execute the additional emulations of the DUT until design requirements are satisfied.

The emulator 110 is a hardware system that emulates DUTs. For a DUT that is to be emulated, the emulator 110 receives from the host system 120 one or more binary files including a description of the DUT (e.g., a gate level or HDL description of the DUT). Additionally, the binary files describe partitions and sections of the DUT created by the host system 120, mappings of the partitions to design FPGAs of the emulator 110, and mappings of sections of the DUT to virtual FPGAs of the emulator 110. Based on the binary files, the emulator 110 configures the appropriate FPGAs and emulates the DUT.

Figure 2:
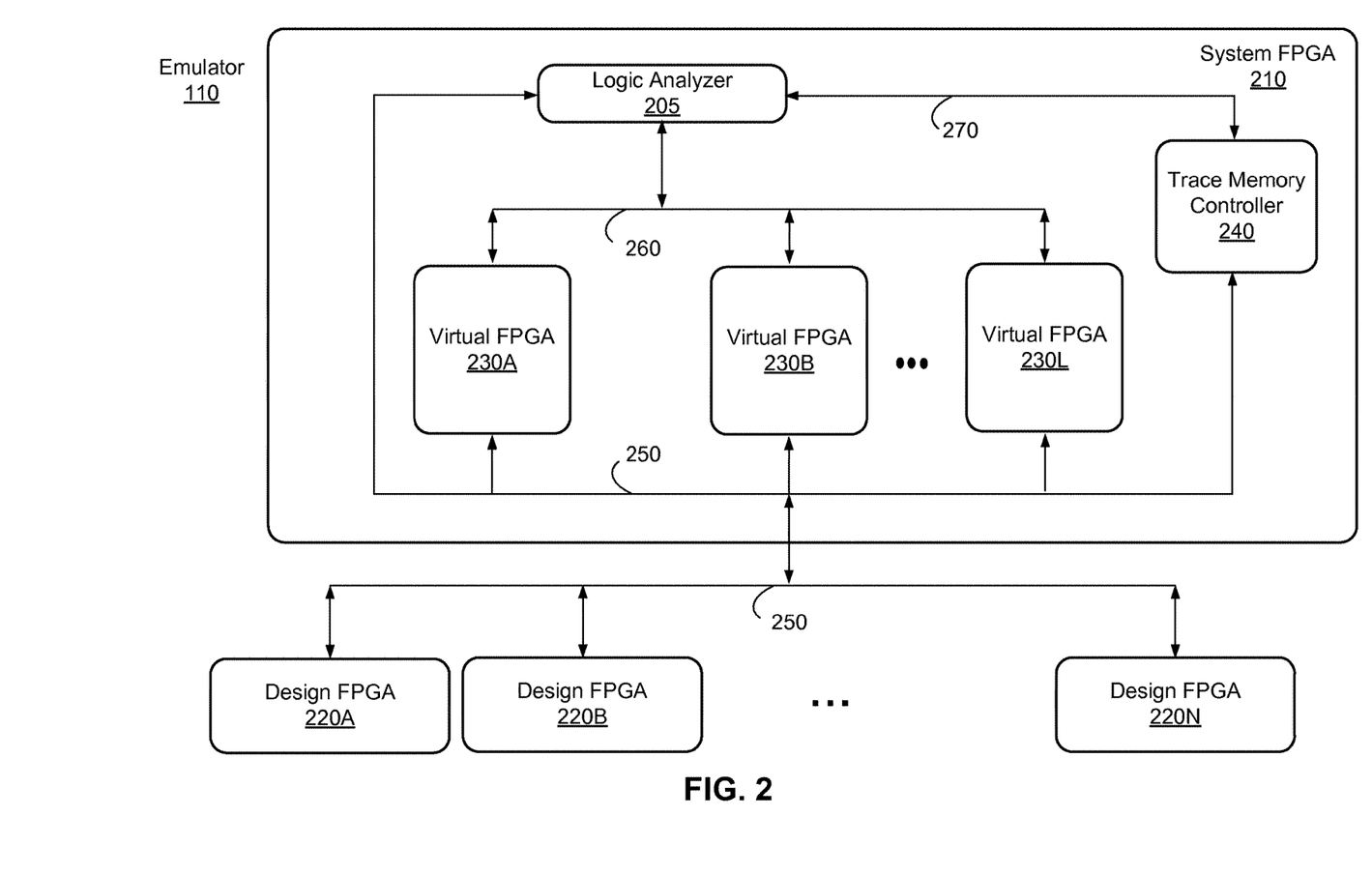
FIG. 2 is a block diagram illustrating an emulator, according to one embodiment.

FIG. 2 illustrates the emulator 110 in more detail, according to one embodiment. The emulator 110 includes a system FPGA 210 and design FPGAs 220A, 220B . . . 220N (collectively referred to as "design FPGAs 220"). Each design FPGA 220 communicates with the system FPGA 210 via a signal link 250. Although a limited number of each of the components is shown within the emulator of FIG. 2, it should be understood that in other embodiments the emulator 110 may include more or less of each component (e.g., additional system FPGAs 210).

Based on binary files received from the host system 120, each design FPGA 220 is configured to emulate a partition of the DUT assigned to it by the host system 120. Collectively the design FPGAs 220 emulate the entire or a portion of the DUT. Each design FPGA 220 is capable of tracing certain signals of the DUT within its respective partition. In one embodiment, each design FPGA 220 includes (or is connected to) a trace memory which stores signals of the DUT traced by the design FPGA 220. A design FPGA 220 transmits the states of traced signals stored in its respective trace memory to the system FPGA 210 via signal link 250. The system FPGA 210 instructs each design FPGA 220 as to which stored signals to provide.

The system FPGA 210 controls emulation of the DUT and processes traced signals. The system FPGA 210 includes a logic analyzer 205, a trace memory controller 240, and virtual FPGAs 230A, 230B . . . 230L (collectively referred to as "virtual FPGAs 230"). The logic analyzer 205 and virtual FPGAs 230 communicate via signal link 260. Based on one or more state machines received from the host system 120, the logic analyzer 205 takes results of virtual FPGA 230 as input via the signal link 260, and provides results of the state machines to the trace memory controller 240 via the signal link 270. The input signals allow the logic analyzer 205 to control the emulations performed by the FPGAs and the tracing of signals via the trace memory controller 240. In addition, the logic analyzer 205 receives traced signals from the design FPGAs 220 via signal link 250 and traced signals from the virtual FPGAs 230 via signal link 260. According to the state machine, the logic analyzer 205 performs logic analysis on the traced signals. Performing logic analysis may include, for example, the logic analyzer 205 analyzing traced signals, counting events, setting or resetting flags, changing states, generating emulations results, and generating additional input signals for the design FPGAs 220 and/or virtual FPGAs 230.

The logic analyzer 205 transmits emulation results to the host system 120 through the interface 115. Periodically or when certain events occur (e.g., when the emulation of the DUT is complete or a user input is received), the logic analyzer 205 transmits the emulation results to the host system 120. In another embodiment, the logic analyzer 205 transmits the emulation results to the host system 120 as they are generated.

The trace memory controller 240 controls which traced signals are provided by the design FPGAs 220 from their respective trace memory to the system FPGA 210. Based on instructions received from the logic analyzer 205 via signal link 270, the trace memory controller 240 transmits instructions to the appropriate design FPGAs 220 to provide certain traced signals.

Each virtual FPGA 230 is a reconfigurable computational block within the system FPGA 210 that can be configured to emulate a section of the DUT based on one or more binary files received from the host system 120. In one embodiment, a virtual FPGA 230 can reproduce both combinational logic and sequential logic. A virtual FPGA 230 may also reproduce more than one level of combinational stage. The section emulated by a virtual FPGA 230 is a part of one or more partitions emulated by the design FPGAs 220. Hence, the section emulated by a virtual FPGA 230 is emulated at least twice. The section is emulated by the virtual FPGA 230 and by one or more design FPGAs 220. As part of emulating its respective section, a virtual FPGA 230 may receive input signals from the logic analyzer 205 and traced signals from the design FPGAs 220 to perform the emulation. Signals traced by a virtual FPGA 230 during the emulation are provided to the logic analyzer 205 via signal link 260.

Figure 4:
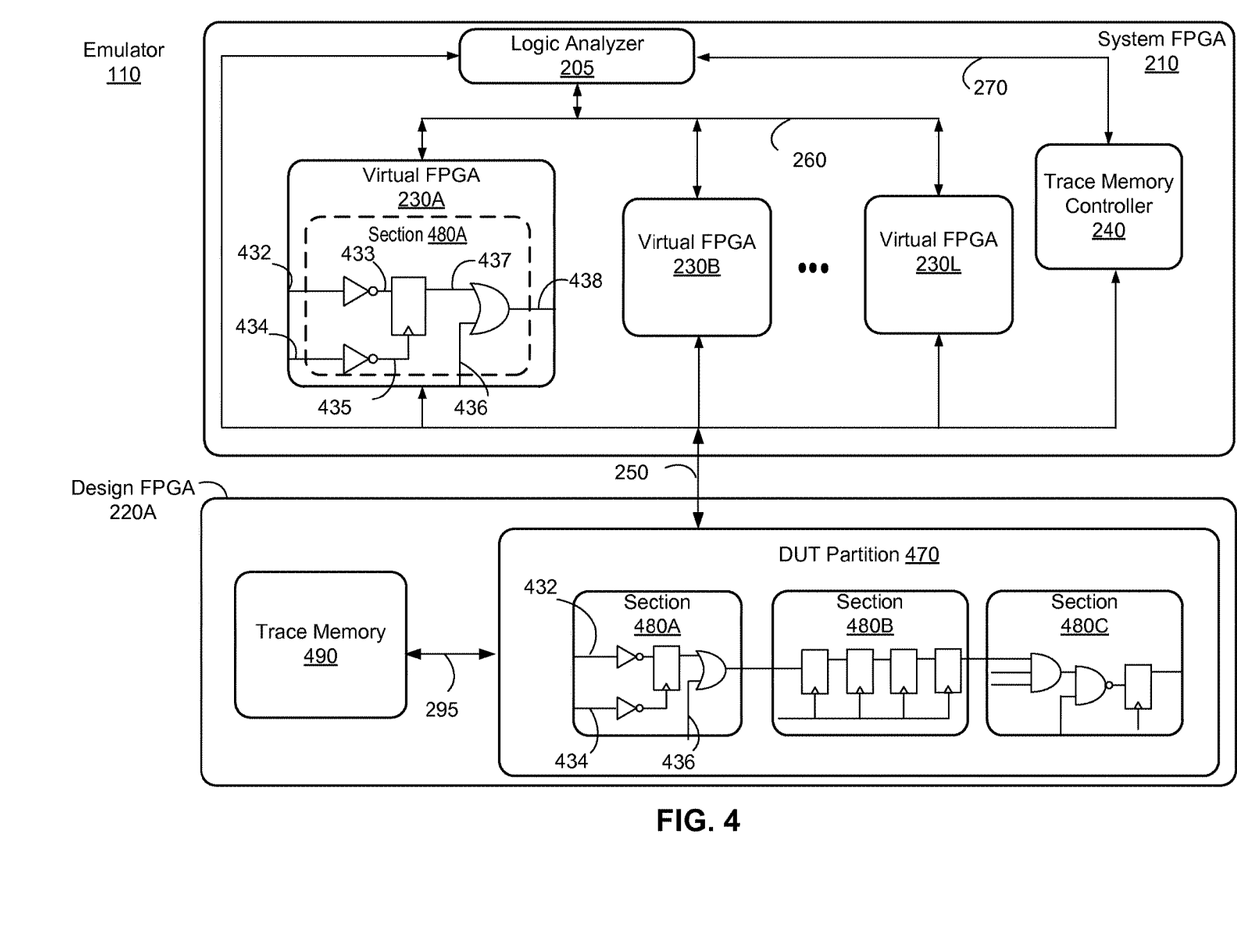
FIG. 4 is a detailed block diagram of the emulator employing virtual FPGAs for performing logic analysis, according to one embodiment.

Referring to FIG. 4, illustrated is a detailed block diagram of the emulator 110 with example circuits to describe an embodiment of the emulator 110 emulating a DUT. For the sake of brevity, only a design FPGA 220A is illustrated, but multiple design FPGAs 220 may be included as described above with respect to FIG. 2.

The design FPGA 220A includes, or is coupled to, a trace memory 490 and is configured to emulate a partition 470 of the DUT mapped to it by the host system 120. FIG. 4 illustrates the circuitry of the partition 470, which includes sections 480A, 480B and 480C that may or may not include the same logic together. In this example, for section 480A of the partition, at the very least signals 432, 434, and 436 are traced by design FPGA 220A during the emulation and transmitted to the trace memory 490 for storage via signal link 295.

As shown by FIG. 4, section 480A of the DUT is also emulated by virtual FPGA 230A. In this example, the virtual FPGA 230A emulates the section 480A using as inputs the signals 432, 434, and 436 which are transmitted from design FPGA 220A or the trace memory 490 to the virtual FPGA 230A at the request of the trace memory controller 240. When the virtual FPGA 230A emulates section 480A, the virtual FPGA 230A traces signals 433, 435, 437, and 438, which are provided to the logic analyzer 205 via signal link 260.

Hence, by the virtual FPGA 230A also emulating section 480A and tracing signals 433, 435, 437, and 438, these signals do not have to be obtained by the system FPGA 210 from the design FPGA 220A. The system FPGA 210 only has to receive three signals (signals 432, 434, and 436) from the design FPGA 220A compared to seven signals (signals 432, 433, 434, 435, 436, 437, and 438) if the virtual FPGA 230A did not emulate the section 480A and design FPGA 220A was tasked with providing the seven signals. In an environment where millions of signals are traced during an emulation, having sections of a DUT emulated by virtual FPGAs 230 will dramatically reduce the amount of signals traced by the design FPGAs 220 and the amount of signals exchanged between the design FPGAs 220 and the system FPGA 210, thereby conserving communication bandwidth and improving the speed of emulations and logic analysis. In addition, the amount of logic needed to multiplex the traced signals from design FPGAs 220 is drastically reduced.

Although section 480A emulated by the design FPGA 220A and section 480A emulated by the virtual FPGA 230 are identical in this example, in other embodiments the two sections may vary. The two sections will perform the same functions, but one section (e.g., section 480A emulated by the virtual FPGA 230A) may include additional logic, for example, to trace certain signals that aren't traced in the other section. Hence, both sections are still substantially the same.

Although not illustrated in this example, virtual FPGAs 230B through 230L can emulate other sections of the DUT. For example, virtual FPGA 230B can emulate section 480B and virtual FPGA 230L can emulate section 480C. Virtual FPGA 230B through 230L may also be configured to emulate other sections that may be a part of partitions mapped to other design FPGAs 220. It also may be the case that one or more of the virtual FPGAs 230 may not emulate their respective mapped section of the DUT during the emulation (e.g., one or more virtual FPGAs 230 are not operating during the emulation) because the signals traced by those virtual FPGAs 230 are not needed by the logic analyzer 205 as described below with respect to FIG. 3.

Figure 3:
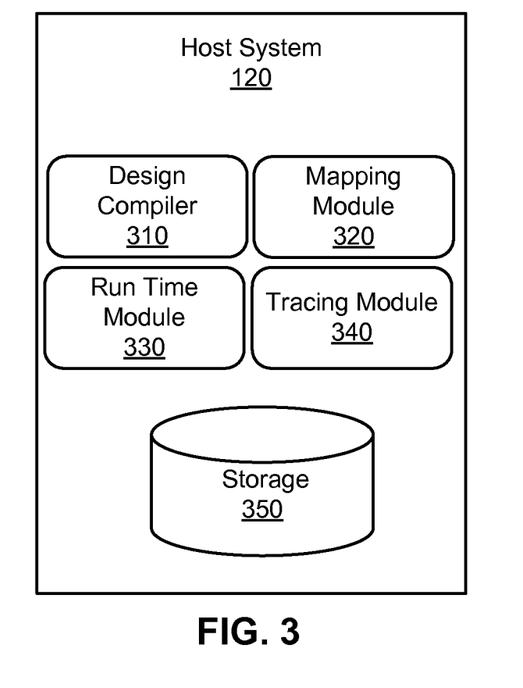
FIG. 3 is a block diagram of a host system, according to one embodiment.

FIG. 3 is a block diagram illustrating the host system 120 in more detail, according to one embodiment. The host system 120 includes a design compiler 310, mapping module 320, run time module 330, tracing module 340, and storage 350. Each of these components may be embodied as hardware, software, firmware, or a combination thereof.

The design compiler 310 converts HDL of DUTs into gate level logic. For a DUT that is to be emulated, the design compiler 310 receives a description of the DUT in HDL (e.g., RTL or other level of abstraction). The design compiler 310 synthesizes the HDL of the DUT to create a gate level netlist with a description of the DUT in terms of gate level logic.

In one embodiment, the design compiler 310 identifies signals of the DUT that should be traced during emulation of the DUT. In one embodiment, the identified signals do not include all signals in the DUT or all states of the DUT. In one embodiment, information is received from a user or from another system, where the information indicates the signals of the DUT that should be traced. The design compiler 310 incorporates signal tracing logic into the DUT to enable tracing of each identified signal. In one embodiment, the design compiler 310 incorporates the signal tracing logic prior to synthesizing the HDL to create the netlist. In this embodiment, prior to synthesizing, the design compiler 310 retrieves HDL of the signal tracing logic from the storage 350 and edits the HDL of the DUT to include the retrieved HDL of the signal tracing logic.

In another embodiment, the design compiler 310 incorporates the signal tracing logic after creating the netlist for the DUT. In this embodiment, the design compiler 310 retrieves a gate level description of the signal tracing logic from the storage 350 and edits the gate level netlist to include the gate level description of the signal tracing logic.

In another embodiment, the description of the DUT received by the design compiler 310 already includes the signal tracing logic. Hence, in this embodiment, the design compiler 310 does not need to add signal tracing logic to trace the identified signals.

The mapping module 320 maps DUTs to FPGAs of the emulator 110. After the design compiler 310 incorporates the signal tracing logic into a DUT and creates a gate level netlist, the mapping module 320 partitions the DUT at the gate level into a number of partitions using the netlist. The mapping module 320 maps each partition to a corresponding design FPGA 220 of the emulator 110. In one approach, the mapping module 320 performs the partitioning and mapping using one or more of the following: design rules, design constraints (e.g., timing or logic constraints), user inputs, and information about the emulator 110.

Moreover, the mapping module 320 identifies sections of the DUT that are to be emulated by virtual FPGAs 230. Similar to the partitioning, the mapping module 320 may identify the sections of the DUT that are to be emulated by virtual FPGAs 230 using one or more of the following: design rules, design constraints, user inputs, and emulator information. A section of the DUT may be a part of a partition or encompass an entire partition. In one embodiment, the aggregate of the identified sections encompass the entire DUT. However, all of the sections may not be simultaneously emulated. In another embodiment, the aggregate of the identified sections includes only a portion of the DUT. In one embodiment, circuitry of the DUT may be covered by multiple sections. Further, the sections of the DUT to be implemented on the virtual FPGAs 230 may be same as the partitions of the DUT to be implemented on the design FPGAs 220. Alternatively, the sections of the DUT to be implemented on the virtual FPGAs 230 may be different from the partitions of the DUT to be implemented on the design FPGAs 220.

The mapping module 320 maps each identified section to a virtual FPGA 230 of the emulator 110. In other embodiments, the mapping module 320 creates the partitions and sections and maps them prior to synthesizing the HDL of the DUT.

The mapping module 320 generates one or more binary files to configure the design FPGAs 220 and the virtual FPGAs 230 to emulate their respective partition/section. In one embodiment, the mapping module 320 generates a binary file for each design FPGA 220 and for each virtual FPGA 230. The mapping module 320 stores the binary files in the storage 350. The mapping module 320 also stores signal information in the storage 350 indicating which signals are traced by each design FPGA 220 and virtual FPGA 230 based on the mappings.

The run time module 330 configures the emulator 110 for performing the emulation of a DUT. The run time module 330 receives, from a user, state machines to load the logic analyzer 205. Additionally, the run time module 330 may receive input parameters to configure the emulator 110. The run time module 330 transmits the state machines and the input parameters to the emulator 110.

Further, the run time module 330 determines which of virtual FPGAs 230 to load with their mapped section for the emulation. To make the determination, the run time module 330 identifies signals of the DUT that need to be traced during the emulation of the DUT based on the state machines. From the signal information stored in the storage 350, the run time module 330 identifies the virtual FPGAs 230 that trace at least one of the identified signals based on the sections mapped to the virtual FPGAs 230. The identified virtual FPGAs 230 have to be loaded for the emulation so that the logic analyzer 205 can obtain all of the DUT signals needed. The run time module 330 transmits the binary files of the identified virtual FPGAs 230 to the emulator 110 for configuring those virtual FPGAs 230.

As an example, returning to FIG. 4, assume that based on the state machines it is determined that signal 437 needs to be traced for use by the logic analyzer 205. In this situation the virtual FPGA 230A needs to emulate its respective mapped section 480A so that signal 437 can be traced. Further, assume that virtual FPGA 230B can trace certain signals based on its mapped section. However, none of those signals were identified as being needed for use by the logic analyzer 205. In this example, the virtual FPGA 230B would not be loaded for emulating its respective section, because there is no need for those signals. Hence, based on the state machines, only a subset of the virtual FPGAs 230 may be loaded for the emulation.

Additionally, the run time module 330 transmits to the emulator 110 the stored binary files of the design FPGAs 220 to configure the design FPGAs 220 to emulate their mapped partition. Because the design FPGAs 220 collectively emulate the entire or portion of the DUT, each design FPGA 220 is loaded and configured to emulate its respective partition.

The tracing module 340 receives emulations results from the emulator 110. In one embodiment, when the tracing module 340 receives emulation results from the emulator, the tracing module 340 stores the emulation results in the storage 350. In one embodiment, the tracing module 340 converts received emulation results for display to a user of the host system 120.

Figure 5:
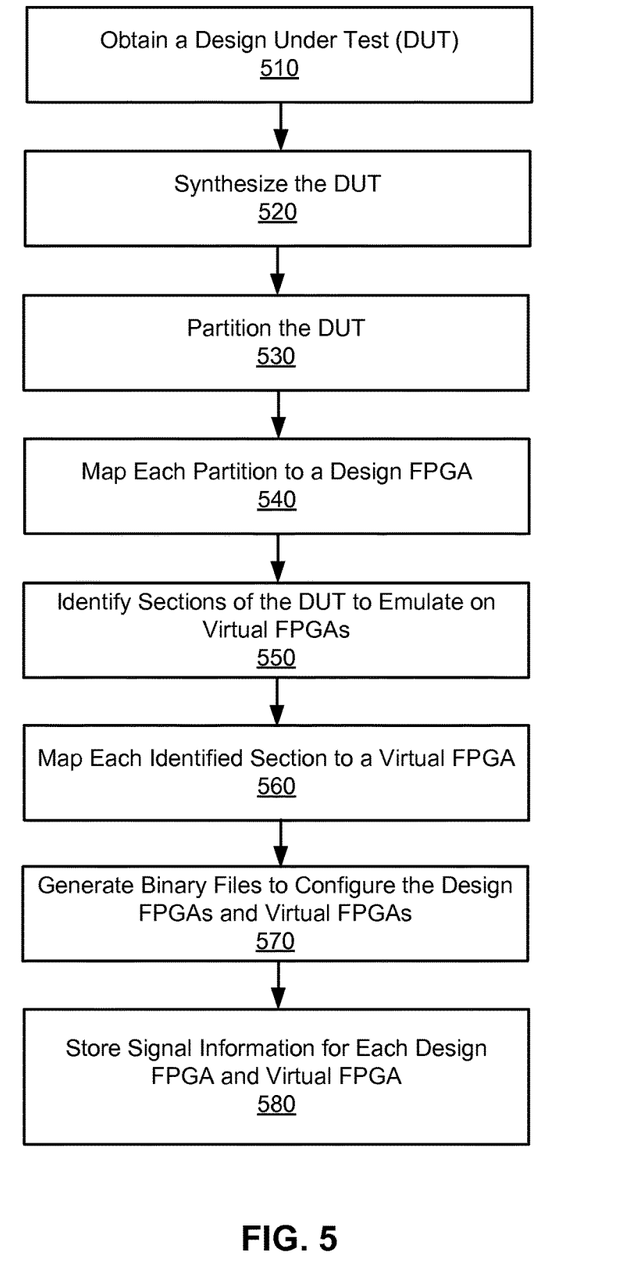
FIG. 5 is a flow chart illustrating the host system preparing for the emulation of a DUT, according to one embodiment.

FIG. 5 is a flow chart illustrating the host system 120 preparing for the emulation of a DUT, according to one embodiment. Other embodiments can perform the steps of FIG. 5 in different orders. Moreover, other embodiments can include different and/or additional steps than the ones described here.

The host system 120 obtains 510 from a user a description of a DUT in HDL. The host system 120 synthesizes 520 the HDL description of the DUT to create a gate level netlist. In one embodiment, the host system 120 also obtains a predetermined list of signals of the DUT that should be traceable during the emulation. To be able to trace each signal, the host system 120 incorporates signal tracing logic into the DUT. In one embodiment, the host system 120 incorporates the signal tracing logic by editing the HDL description of the DUT prior to synthesizing the HDL description. In another embodiment, the signal tracing logic is incorporated after synthesizing the HDL description by editing the netlist. In another embodiment, the description of the DUT obtained by the host system 120 includes the signal tracing logic.

The host system 120 partitions 530 the DUT at the gate level into a number of partitions using the gate level netlist. The host system 120 maps 540 each partition to a design FPGA 220 of the emulator 110. The host system 120 identifies 550 sections of the DUT to emulate on virtual FPGAs 230. The host system 120 maps 560 each identified section of the DUT to a virtual FPGA 230 of the emulator 110.

The host system 120 generates 570 binary files that include information to configure the design FPGAs 220 and virtual FPGAs 230 to emulate their respective mapped partition/section of the DUT. In one embodiment, the host system 120 generates a binary file for each design FPGA 220 to configure the design FPGA 220 to emulate its mapped partition and generates a binary file for each virtual FPGA 230 to configure the virtual FPGA 230 to emulate its mapped section. In one embodiment, the host system 120 generates the binary files for the design FPGAs 220 and the binary files for the virtual FPGA 230 in a separate and parallel process. The host system 120 stores 580 signal information for each design FPGA 220 and virtual FPGA 230 indicating which signals are traced by the FPGA when it emulates its mapped partition/section.

Figure 6:
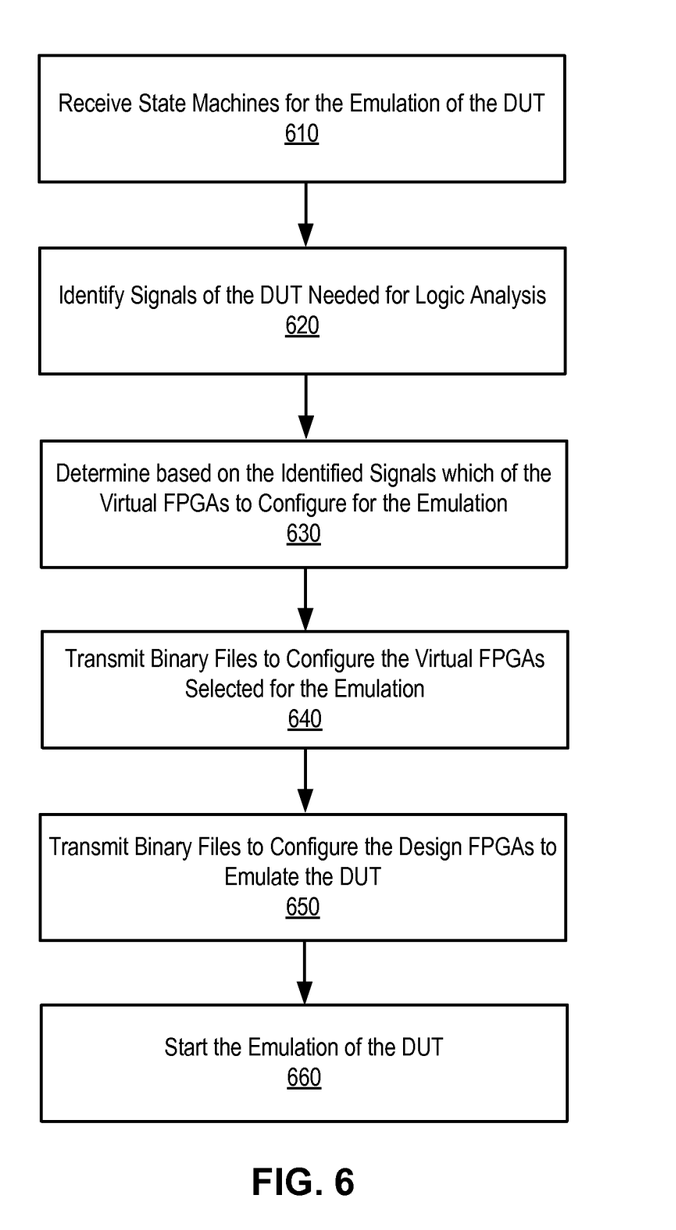
FIG. 6 is a flow chart illustrating the host system configuring an emulator for the emulation of a DUT, according to one embodiment.

FIG. 6 is a flow chart illustrating the host system 120 configuring the emulator 110 for the emulation of the DUT, according to one embodiment. Other embodiments can perform the steps of FIG. 6 in different orders. Moreover, other embodiments can include different and/or additional steps than the ones described here.

The host system 120 receives 610 state machines for the emulation of the DUT from a user. The host system 120 identifies 620 signals of the DUT needed for performing logic analysis based on the state machines. The host system 120 determines 630 based on the identified signals, which of the virtual FPGAs 230 to configure to emulate their respective mapped section during the emulation. In one embodiment, from stored signal information indicating which signals are traceable by each virtual FPGA 230, the host system 120 identifies the virtual FPGAs 230 that trace at least one of the signals needed for performing logic analysis. The host system 120 selects to only configure for the emulation the identified virtual FPGAs 230 that can trace a signal needed for logic analysis.

The host system 120 transmits 640 binary files to configure the virtual FPGAs 230 selected for the emulation. In addition, the host system 120 transmits 650 binary files to configure the design FPGAs 220 to emulate the DUT. The host system starts 660 the emulator 110 to execute the emulation of the DUT. During the emulation of the DUT or when the emulation is paused, sections of the DUT to be emulated by the virtual FPGAs 230 may be replaced if needed. Hence, during the emulation of the DUT or when the emulation is paused, the host system 120 may transmit additional binary files to change which virtual FGPAs 230 are operating.

Computing Machine Architecture

Figure 7:
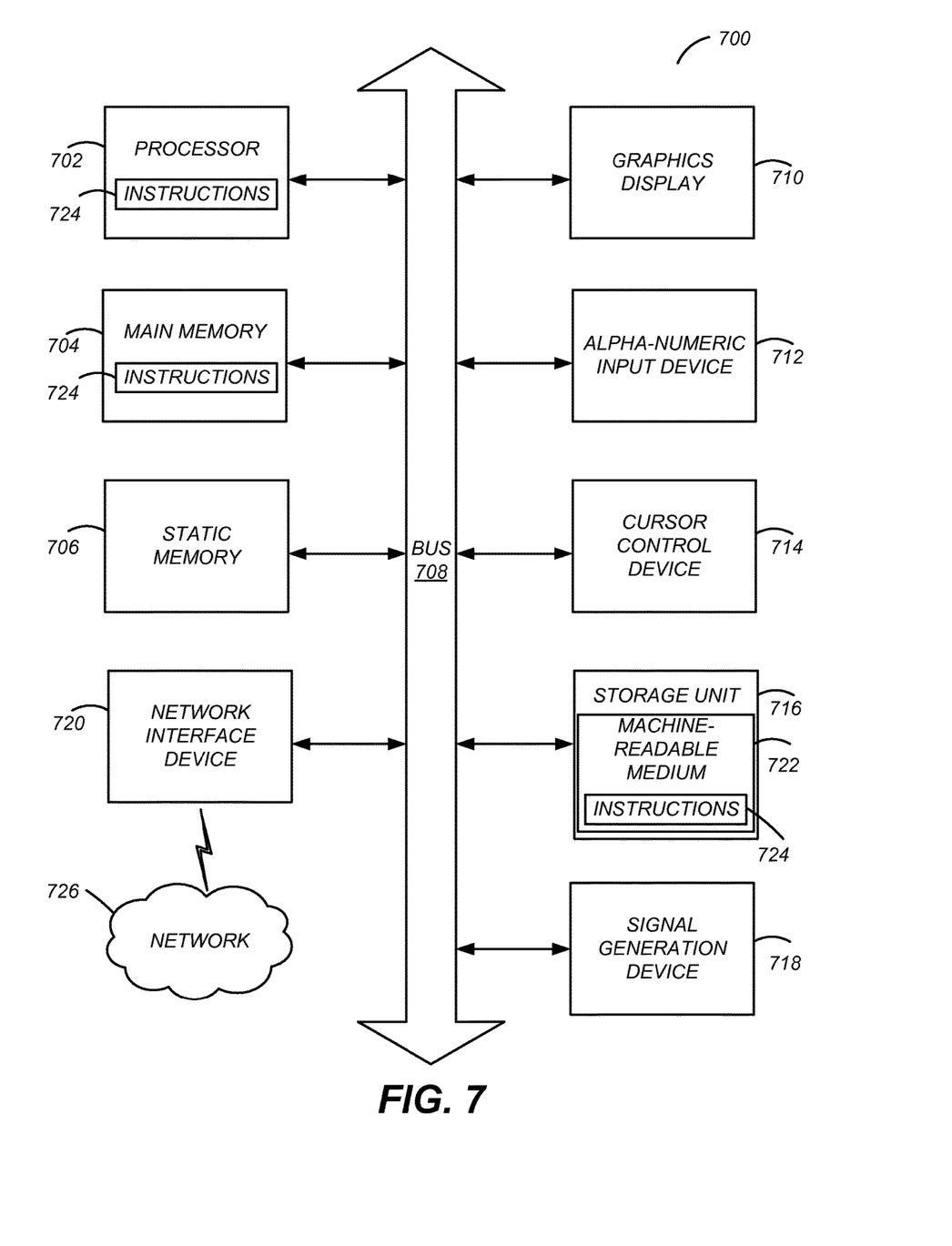
FIG. 7 illustrates one embodiment of components of an example machine able to read instructions from a machine-readable medium and execute them in a processor (or controller).

Turning now to FIG. 7, it is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software or program code) for causing the machine to perform (execute) any one or more of the methodologies described with FIGS. 1-6. The computer system 700 may be used for one or more of the entities (e.g., host system 120, emulator 110) illustrated in the emulation environment 100 of FIG. 1.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 700 can have different and/or other components than those shown in FIG. 7. In addition, the computer system 700 can lack certain illustrated components. For example, a computer system 700 acting as the emulator 110 may include a hardware processor 702, a storage unit 716, a network interface device 720, and multiple configurable logic circuits (as described above with reference to FIG. 1), among other components, but may lack an alphanumeric input device 712 and a cursor control device 714.

Additional Configuration Considerations

It is noted that although the subject matter is described in the context of emulation environment for emulation of digital circuits and systems, the principles described may be applied to analysis of any digital electronic devices. Moreover, while the examples herein are in the context of an emulation environment including FPGAs, the principles described herein can apply to other analysis of hardware implementations of any digital logic circuitries or software simulation such as EDAs.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. Hardware module implemented herein may be implemented in dedicated and permanently configured circuitry, or in temporarily configured circuitry (e.g., configured by software).

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for bandwidth efficient logic analysis of digital logic circuits through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An emulator comprising:
a plurality of design field-programmable gate arrays (FPGAs) configured to collectively emulate a design under test (DUT) and produce a first signal of the DUT, wherein a first design FPGA of the plurality of design FPGAs is configured to emulate a section of the DUT; and
a system FPGA in communication with the plurality of design FPGAs and configured to receive the first signal from the first design FPGA, the system FPGA comprising:
a plurality of virtual FPGAs, at least one of the plurality of virtual FPGAs configured to receive the first signal, emulate substantially the same section of the DUT that the first design FPGA is configured to emulate, and produce a second signal of the DUT based on the first signal, and
a logic analyzer configured to perform logic analysis based on the second signal.

2. The emulator of claim 1, wherein from the plurality of virtual FPGAs a subset of virtual FPGAs are configured to operate during emulation of the DUT based on a plurality of signals of the DUT used by the logic analyzer.

3. The emulator of claim 2, wherein each virtual FPGA from the subset is configured to emulate a corresponding section of the DUT and generate a corresponding signal from the plurality of signals.

4. The emulator of claim 1, wherein the first signal is stored by a trace memory and provided to the system FPGA responsive to receiving a request from the system FPGA.

5. The emulator of claim 1, wherein the logic analyzer is configured to perform the logic analysis according to a state machine.

6. A non-transitory computer readable medium storing instructions, the instructions to configure an emulator to:
  emulate, with a design field-programmable gate array (FPGA), a section of a design under test (DUT);
  produce, by the design FPGA, a first signal based on the emulation of the section;
  transmit, from the design FPGA to a system FPGA, the first signal produced by the design FPGA;
  emulate, with a virtual FPGA within the system FPGA, substantially the same section of the DUT that was emulated with the design FPGA, the emulation with the virtual FPGA based on the first signal;
  produce, by the virtual FPGA, a second signal based on the emulation of the substantially the same section; and
  perform logic analysis based on the second signal.

7. The non-transitory computer readable medium of claim 6, wherein the design FPGA is a first design FPGA of a plurality of design FPGAs.

8. The non-transitory computer readable medium of claim 6, wherein the design FPGA is a computational block from a subset of computational blocks, the subset of computational blocks are configured to operate during emulation of the DUT based on a plurality of signals of the DUT used for performing the logic analysis, and wherein each computational block from the subset is configured to emulate a corresponding section of the DUT and generate a corresponding signal from the plurality of signals.

9. The non-transitory computer readable medium of claim 6, wherein the logic analysis is performed according to a state machine.

10. A method comprising:
  emulating, with a design field-programmable gate array (FPGA), a section of a design under test (DUT);
  producing, by the design FPGA, a first signal based on the emulation of the section;
  transmitting, from the design FPGA to a system FPGA, the first signal produced by the design FPGA;
  emulating, with a virtual FPGA within the system FPGA, substantially the same section of the DUT that was emulated with the design FPGA, the emulation with the virtual FPGA based on the first signal;
  producing, by the virtual FPGA, a second signal based on the emulation of the substantially the same section; and
  performing logic analysis based on the second signal.

11. The method of claim 10, wherein the design FPGA is a first design FPGA from a plurality of design FPGAs.

12. The method of claim 10, wherein the design FPGA is a computational block from a subset of computational blocks, the subset of computational blocks are configured to operate during emulation of the DUT based on a plurality of signals of the DUT used for performing the logic analysis, and wherein each computational block from the subset is configured to emulate a corresponding section of the DUT and generate a corresponding signal from the plurality of signals.

13. The method of claim 10, wherein the logic analysis is performed according to a state machine.

14. A non-transitory computer readable medium configured to store instructions, the instructions executed by one or more processors for:
  transmitting, by a host system to an emulator, information to configure a plurality of design field-programmable gate arrays (FPGAs) included in the emulator to collectively emulate a design under test (DUT);
  identifying, by the host system, a plurality of signals of the DUT used by a system FPGA included in the emulator in performing logic analysis during emulation of the DUT, the system FPGA in communication with each of the plurality of design FPGAs for receiving a subset of the identified plurality of signals from the design FPGAs;
  selecting, by the host system from a plurality of computational blocks included in the system FPGA, a subset of computational blocks to configure for the emulation of the DUT, the subset of computational blocks selected based on the identified plurality of signals and selected to emulate at least a section of the DUT that is substantially the same as a section emulated by one of the plurality of design FPGAs; and
  transmitting, by the host system to the emulator, information to configure the computational blocks in the subset for the emulation, at least one of the computational blocks in the subset configured based on the information to generate a signal from the plurality of signals during the emulation.

15. The non-transitory computer readable medium of claim 14, wherein each of the computational blocks in the subset is selected based on the computational block being assigned to emulate a section of the DUT that includes a signal from the plurality of signals.

16. The non-transitory computer readable medium of claim 14, wherein based on the information transmitted to configure the computational blocks, each computational block in the subset is configured to generate a signal from the plurality of signals.

17. The non-transitory computer readable medium of claim 14, wherein a number of computational blocks in the subset is less than the plurality of computational blocks.

18. The non-transitory computer readable medium of claim 14, wherein one or more of the plurality of signals are generated by the plurality of design FPGAs and one or more of the plurality of signals are generated by the subset of computational blocks.

19. The non-transitory computer readable medium of claim 14, wherein computational blocks from the plurality of computational blocks not included in the subset are not in operation during the emulation of the DUT.

20. The non-transitory computer readable medium of claim 14, wherein at least one computational block generates the signal based on an additional signal of the DUT generated by a design FPGA from the plurality of design FPGAs.

* * * * *